United States Patent [19]

Richter et al.

[11] Patent Number: 4,679,357
[45] Date of Patent: Jul. 14, 1987

[54] METHOD AND APPARATUS FOR DISPLACING A HONING TOOL

[75] Inventors: Günter Richter, Kirchheim-Nabern; Reinhard Fröschle, Ostfildern, both of Fed. Rep. of Germany

[73] Assignee: Maschinenfabrik Gehring Gesellschaft mit beschränkter Haftung & Co., Ostfildern, Fed. Rep. of Germany

[21] Appl. No.: 742,610

[22] Filed: Jun. 7, 1985

[30] Foreign Application Priority Data

Jun. 7, 1984 [DE] Fed. Rep. of Germany ....... 3421193

[51] Int. Cl.⁴ .................. B24B 33/02; B24B 33/08
[52] U.S. Cl. .................. 51/281 P; 51/290; 51/34 H; 51/165.93; 51/165.87
[58] Field of Search ........... 51/165.93, 165.77, 165.71, 51/165.87, 103 TF, 290, 281 P, 281 R, 34 H, 58, 112, 111 R

[56] References Cited

U.S. PATENT DOCUMENTS

| | | | |
|---|---|---|---|
| 3,001,336 | 9/1961 | Bauer | 51/103 TF |
| 3,232,008 | 2/1966 | Estabrook | 51/165.93 |
| 3,466,809 | 9/1969 | Estabrook | 51/165.77 |
| 4,266,375 | 5/1981 | Nishimura et al. | 51/165.77 |
| 4,419,612 | 12/1983 | Reda et al. | 51/165.71 |
| 4,528,776 | 7/1985 | Estabrook | 51/165.87 |

Primary Examiner—Frederick R. Schmidt
Assistant Examiner—Bradley I. Vaught
Attorney, Agent, or Firm—Becker & Becker, Inc.

[57] ABSTRACT

A method of displacing or feeding the honing tool of a honing machine during long stroke honing when machining workpiece bores. Rapid displacement feeding or and subsequent machining displacement or stock removal feeding are effected with only a single motor employed in common for different operation, which is controlled in such a way that during rapid feeding or displacement it operates at high speed and low limiting angular momentum or torque limit. Due to the low angular momentum or torque limit during rapid displacement, the speed is rapidly reduced when the honing stones come to rest agianst the bore wall. The control mechanism thereupon reverses the single motor, returns the honing stones by a small amount, and changes over to the machining or stock removal feeding process, which is accomplished at low motor speed and high limiting angular momentum. When a pretermined finished size has been achieved, a displacement control mechanism returns the honing tool to its starting position. The invention covers a method for automatic displacement control of a honing machine, as well as an apparatus for carrying out this method.

1 Claim, 5 Drawing Figures

METHOD AND APPARATUS FOR DISPLACING A HONING TOOL

BACKGROUND OF THE INVENTION

1. Field of the Invention

The present invention relates to a method of displacing a honing tool for machining workpiece bores, and includes the steps of initially rapidly displacing the tool until the latter contacts the workpiece, and then changing over to a slower machining displacement. The present invention also relates to an apparatus for carrying out this method. This apparatus has, for the honing tool, a displacement apparatus which provides for a rapid displacement and for a slower machining displacement or stock removal feeding.

2. Description of the Prior Art

In modern honing machines, the honing tool is rapidly displaced until the honing stones contact the workpiece, whereupon the honing tool is changed over to the actual machining displacement speed, which is slower. For this purpose, with one known arrangement of this type (German Offenlegungsschrift No. 20 41 061), a first motor is provided for the rapid displacement, and a second motor is provided for the slower machining displacement.

The changing over from the rapid displacement to the machining displacement or stock removal feeding is effected by a switching mechanism which, by means of a digital sensor, measures the speed of the displacement spindle, in which, when the speed drops off as a result of the braking effect as the honing stones come to rest against the wall of the workpiece bore, stops the high-speed first motor and at the same time starts the second motor, with the lagging of the high-speed motor after being turned off, resulting from its inertia, being absorbed by a resilient connecting member disposed between the motor and the displacement spindle.

This heretofore known arrangement is supposed to reduce the overall working time during honing, and avoid a breaking of the honing stones and damage to the workpieces.

However, this is only inadequately accomplished. Especially with honing tools having a small diameter, damage due to overstressing repeatedly occurs because the speed of the displacement or feeding spindle is reduced only after the honing stones have already been pressed with considerable force against the wall of the workpiece bore.

The reason for this is primarily because during the transmission of the displacement or feeding movement, considerable frictional forces have to be overcome; in particular due to the significant conversion of the axial displacement or feeding movement into a radial movement of the honing stones via a wedge gearing at relatively slight axial forces, large radial displacement forces result which prevent a sensitive "location or cutting of the honing stones". Furthermore, the construction of the heretofore known arrangement, which operates with two displacement motors, is very expensive and complex, and accordingly is, of course, also susceptible to breakdown.

An object of the present invention is to provide a displacement or feeding apparatus of the aforementioned general type which on the one hand has a simple construction and operates reliably, and on the other hand precludes overstressing of the tool and/or the workpiece, even when very small honing diameters are involved.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The method of the present invention is characterized primarily by the steps of effecting the rapid feeding or displacement and the machining displacement by means of a common motor, and by presetting the displacement speed of the rapid feeding or displacement, the displacement or feeding speed of the machining displacement or stock removal feeding, and a respective angular momentum limit of the motor.

The apparatus of the present invention is characterized primarily by a common motor for both the rapid feeding or displacement and the machining displacement or stock removal feeding, and by a presettable control unit for displacement or feeding speed and torque limit, with this control unit being connected to the motor.

After the tool has been introduced into the workpiece bore which is to be machined, the displacement motor starts with a high speed and a low torque limit. When the honing stones come to rest against the bore wall, the preset limiting angular momentum or torque limit is achieved and the drive is stopped. This is recognized by the control mechanism in conjunction with the torque limit sensing device. There immediately follows the automatic changing over to a preset higher operating torque limit and to a preset low speed of the displacement motor, whereupon the displacement or feeding continues at a slower speed (machining displacement or stock removal feeding speed) at higher torque limit.

Pursuant to a particularly advantageous embodiment of the present invention, the control mechanism is embodied such that after the tool has been introduced into the workpiece bore, the stroke movement of the honing spindle is terminated or interrupted as long as the honing stones are rapidly displaced After the honing stones come to rest against the bore wall, the displacement or feeding apparatus effects a slight predetermined return movement. Thereafter, the operating stroke movement as well as the spindle rotation are started, and at the same time the displacement or feeding motor is changed over to the machining displacement or stock removal feeding speed.

Due to the inventive slight return of the displacement or feeding system subsequent to the rapid feeding or displacement, which has stopped when the honing stones engage the bore wall, a particularly careful cutting by the honing tool is possible.

As a result, a disturbance-free operating sequence is assured even with small bore diameters, and damage due to tool breakage is reliably avoided.

Further advantageous specific embodiments of the present invention will be described subsequently.

DESCRIPTION OF PREFERRED EMBODIMENTS

Figure 1:
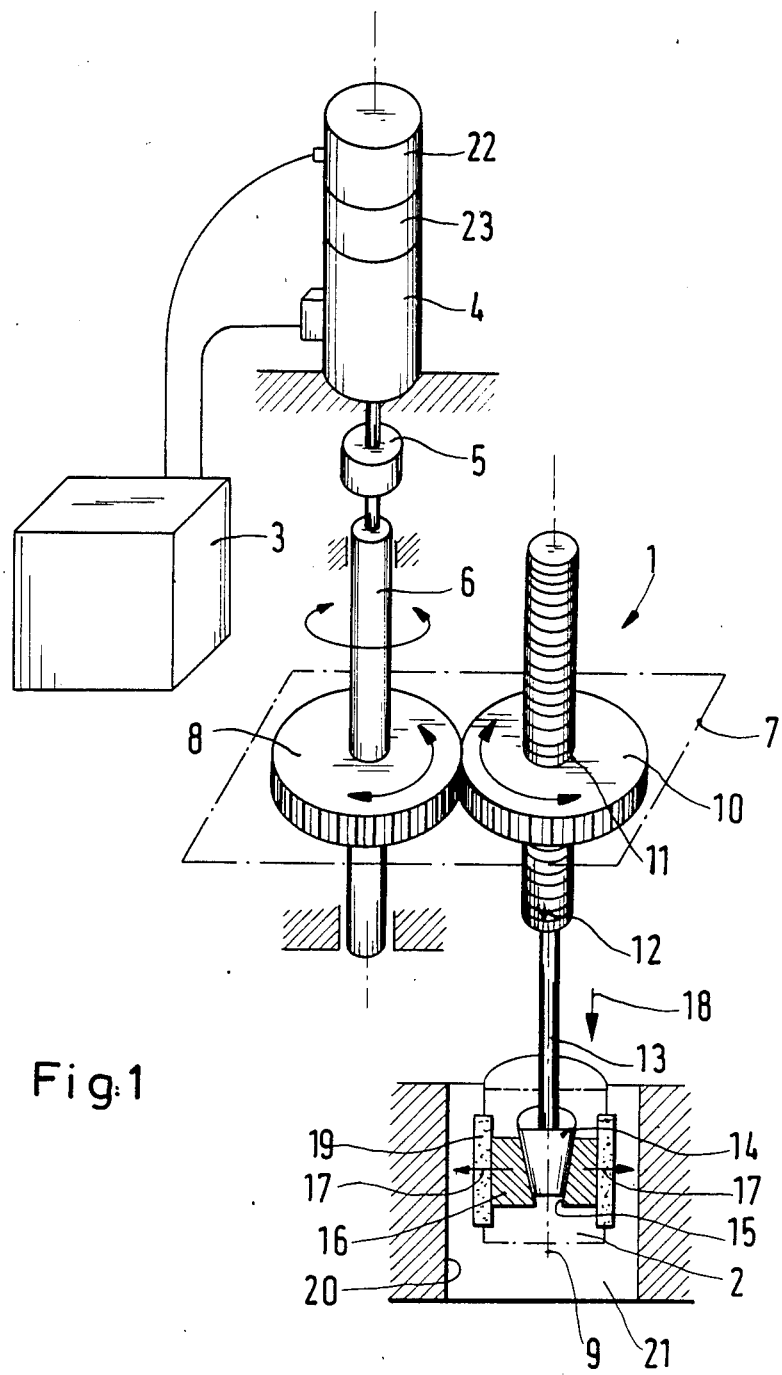
FIG. 1 is a perspective view that schematically illustrates the composition, setup and arrangement of the inventive apparatus.

Referring now to the drawings in detail, FIG. 1 schematically illustrates one inventive apparatus 1 for driving and controlling the displacement or feeding of a honing tool 2 of a honing machine, which is not shown in any detail.

Since honing machines and honing tools themselves are known, they need not be explained in detail in this application.

The apparatus 1 essentially comprises a control and regulating unit 3, which is connected with a single fixed direct-current motor 4 which, in turn, drives a traverse shaft 6 via a coupling 5. The position of the direct current motor 4 is controlled by a torque limit sensing device 22, and the speed of the motor is adjusted by means of a tacho-alternator 23. The traverse shaft 6 forms the drive shaft for a displacement gearing 7 which together with the honing tool 2 can be moved axially up and down in a known manner. For this purpose, the drive gear 8 of the displacement gearing 7 is disposed on the shaft 6 in such a way that it can be shifted axially relative thereto, but cannot rotate relative thereto. The drive gear 8 meshes with a mating gear 10 which is disposed coaxial to the tool axis 9. The mating gear 10 has a concentric threaded bore 11 for receiving a threaded spindle 12 which is aligned with the tool axis 9.

Via non-illustrate means, the threaded spindle 12 is secured against rotation and, in conformity with the thread pitch, effects an axial movement when the mating gear 10 is rotated; this axial movement is transmitted directly to the displacement shaft 13 of the honing tool 2.

During an axial downward movement (arrow 18) of the displacement shaft 13, the truncated cone 14, which is integrally embodied with the displacement shaft 13, pushes the honing stone holder 16, which is provided with oppositely directed or cooperating wedge surfaces 15, radially outwardly (arrow 17) in a known manner, as a result of which the honing stones 19 are displaced and pushed against the wall 20 of a workpiece bore 21.

FIGS. 2 to 5 show block diagrams of various embodiments of the previously described displacement apparatus in conjunction with the overall control mechanism for the machine. With the aid of the following sequence description, the operation will be described and the individual elements of the control and regulating unit 3 will be clarified.

After the machine is started by a non-illustrated overall control mechanism, the honing tool 2 is introduced into the workpiece bore 21, and this travel movement is stopped. Via a signal 24, the displacement or feed control mechanism 25 now receives the command "start displacement". Thereupon, via a signal 26, the control mechanism 25 transmits pulses in rapid succession to the register of a position cycle regulator 27, as a result of which an analog potential is formed at the output side of the regulator 27 and is transmitted via a connection 28 to a power member 29, which controls the motor 4. The motor 4 now begins to rotate rapidly, and the honing stones 19 are rapidly displaced, as previously described.

A specific maximum torque limit is prescribed for the motor 4 by the power member 29. This limiting angular momentum or torque limit, which is also designated as applied momentum, can be set by means of an input element 32, which is associated with the control mechanism 25, and can be input into the power member 29 via a signal 33.

The torque limit sensing device 22, which is connected with the motor 4 in a known manner, generates for each revolution of the motor a certain number of pulses, which are transmitted via a signal 30 to the position cycle regulator 27, and are at the same time transmitted via a signal 31 to the displacement or feed control mechanism 25.

As soon as the honing stones 19 rest against the wall 20 of the workpiece bore 21, and the preset applied momentum is achieved, the motor 4 stops and the torque limit sensing device 22 no longer generates pulses. This condition is recognized by the displacement or feed control mechanism 25 which cancels the signal 26 transmitted to the position cycle regulator 27, and sets the register of the regulator 27 to zero via a "reset" signal 34; the potential at the output 28 of the regulator 27 becomes zero. Immediately following this, the displacement or feed control mechanism 25 again inputs pulses in rapid succession into the register of the position cycle regulator 27 via signal 36 (motor reversed), whereby at the output of regulator 27 there now exists a negative potential which, via the power member 29, effects a rotation of the motor 4 in the opposite direction. The rotation of the motor 4 is again converted by the torque limit sensing device 22 into pulses which are transmitted via the signal 31 to the displacement or feed mechanism 25.

When the number of pulses previously set by the displacement or feed control mechanism 25 has been reached, the latter cancels the signal 36 and at the same time transmits the "reset" signal 34 to the position cycle regulator 27, whereupon the motor 4 again stops.

Due to the brief rotation of the motor 4 in the opposite direction, the entire displacement system is returned by a small amount; the honing stones 19 still rest against the bore wall 20, yet the overall displacement or feed system is mechanically relieved. The amount of the return can inventively either be automatically computed by the displacement or feed control mechanism 25 as a function of prescribed tool characteristics, or can be input via an input element 38.

The displacement or feed control mechanism 25 now recognizes the position "honing stones engaged", and transmits a signal 35 to the overall control mechanism of the machine, which activates the power stroke movement and effects rotation of the spindle. At the same time, the machining feed is initiated, for which purpose the displacement or feed control mechanism 25 inventively and successively inputs via the signal 26 only one pulse at a time into the position cycle regulator 27; in other words, the regulator 27 must be empty before the next pulse is input. This is achieved by having the motor 4 rotation, which is induced in response to the first pulse, trigger a pulse of the torque limit sensing device 22, which via the signal 30 cancels the register of the position cycle regulator 27, as a result of which the motor 4 is again immediately stopped. Via the signal 37, the condition "position cycle regulator = 0" is signalled to the displacement or feed control mechanism 25, which thereupon releases the next pulse, and the previously described process is repeated.

Thus the motor 4 rotates further by an angular step with every pulse; i.e., the motor 4 now operates like a stepping motor.

Due to the periodic succession of the pulses (signal 26), which can be input at an input element 39 of the displacement or feed control mechanism 25, the displacement or feed speed is determined.

Along with the activation of the machining displacement, the power member 29 prescribes for the motor 4 a different limiting angular momentum or torque limit, for example a higher momentum, which can also be designated as the machining momentum or torque limit.

This machining momentum or torque limit can be set via an input element 42 associated with the displacement or feed control mechanism 25, and can be input into the power member 29 via a signal 33.

It is furthermore possible pursuant to the present invention to provide still other input elements for the presetting of various displacement or feeding speeds and machining momentum or torque limits, in order to achieve optimum machining conditions which conform to the machining task at any given time, and which assure short machining times and great precision.

Thus, in the illustrated embodiments, a second displacement speed can be input into the mechanism 25 via an input element 43, and a second machining momentum or torque limit can be input via an input element 44. Switching the displacement over to these values, and switching the displacement off when the finished size has been achieved, is effected either pursuant to the values preselected at further input elements, or in conformity with a measuring device as a function of the machining or stock removal, as will be described subsequently in greater detail.

As soon as the finished size is achieved the displacement or feed control mechanism 25 no longer transmits a pulse into the position cycle regulator 27, and the motor 4 stops; this state is recognized and stored in the displacement or feed control mechanism as "finished size". Furthermore, the displacement or feed control mechanism 25 transmits the state "finished size achieved" with the signal 46 to the overall control mechanism of the machine, which processes this signal in a known manner and withdraws the signal 24 (start). Immediately following, the displacement or feed control mechanism 25 again inputs in rapid succession with the signal 36 (motor reversed) into the register of the position cycle regulator 27, whereby at the output of the latter there again exists a negative potential which, via the power member 29, causes the motor 4 to turn in the opposite direction; as a result, the displacement is returned. The speed of the motor 4 is again converted by the torque limit sensing device 22 into pulses which are transmitted via the signal 31 to the displacement or feed control mechanism 25. When the number of pulses previously set by the displacement or feed control mechanism 25 is achieved, the latter cancels the signal 36 and at the same time transmits the "reset" signal 34 to the position cycle regulator 27; the motor 4 again stops.

The magnitude of the return can be set at an input element 41, and is preferably selected in such a way that it corresponds to the machining tolerance of the workpieces plus a safety margin. The honing process ends with the return of the honing stones, and the previously described operating sequence starts in this position for the next workpiece.

Pursuant to a further feature of the present invention, the previously described displacement or feed control mechanism is embodied in such a way that the machining values which are to be predetermined can be input directly into the input elements in $\mu$m or in $\mu$m/sec, with reference to the workpiece diameter. For this purpose, the displacement or feed control mechanism 25, as represented via block diagrams and schematic illustrations of FIGS. 2 to 5 inclusive, is provided with a further input element 64, in which can be input, in $\mu$m per displacement step, the machining predetermined from the respectively used honing tool as a function of the cone angle 14, 15.

With the input of this value, the displacement or feed control mechanism 25 automatically converts all further value inputs into $\mu$m or into $\mu$m/sec with reference to the workpiece diameter.

Furthermore, the displacement or feed control mechanism 25 is inventively provided with an indicator 40, which shows the displacement or feed steps, or selectively, by means of a switch 65, the machining, in $\mu$m with reference to the workpiece diameter.

The displacement or feed control mechanism 25 is also provided with an input element 69 into which is input the maximum possible overall wear of the honing tool in conformity with the prescribed thickness of the grinding material.

The displacement or feed control mechanism 25 recognizes when the input value converted thereby with reference to the workpiece diameter is achieved, and transmits to the overall control mechanism of the machine a signal 70 which corresponds to "change workpiece".

Figure 2:
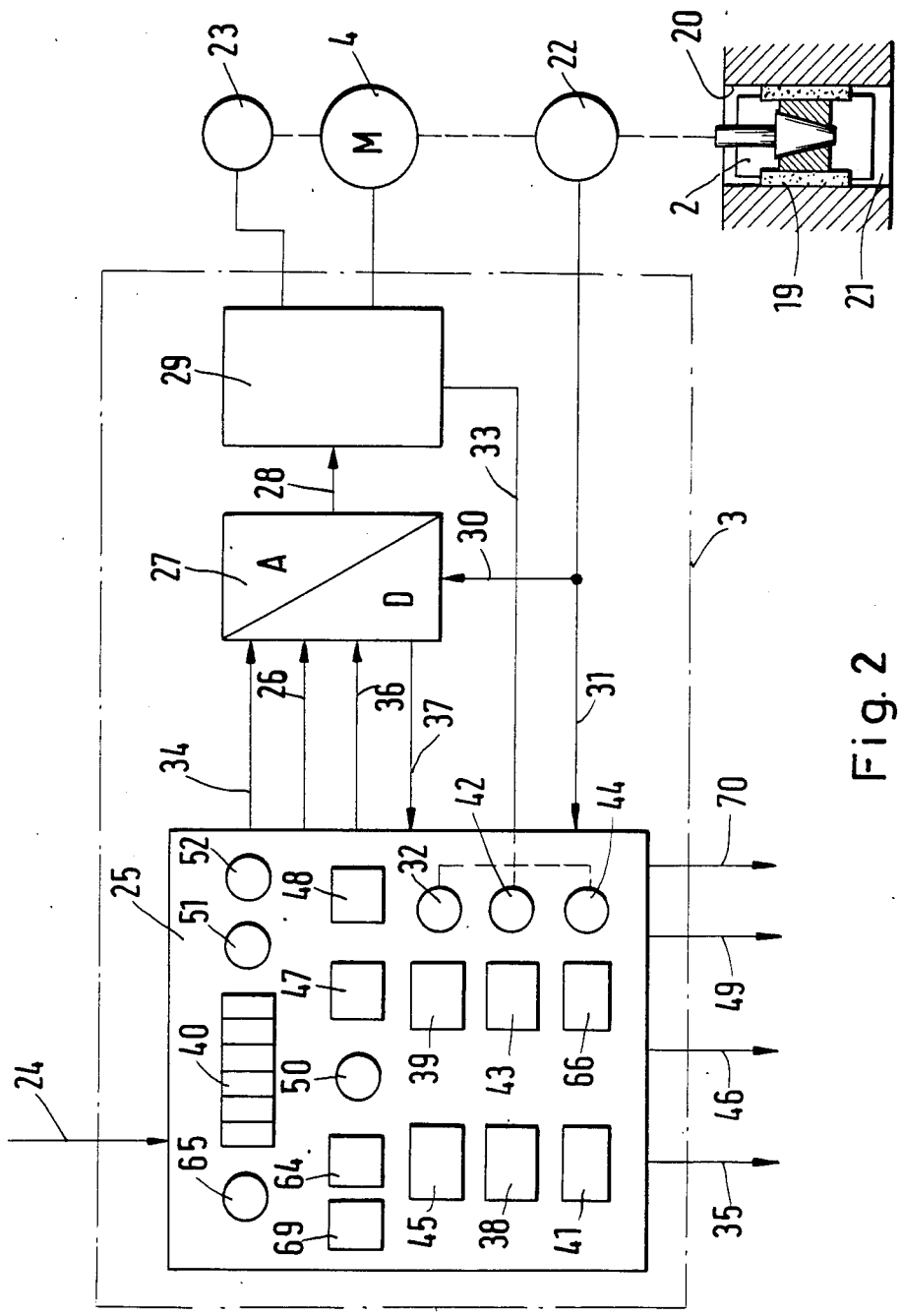
FIGS. 2 to 5 are views that show block diagrams and partial schematic illustrations of various embodiments of the apparatus of FIG. 1.

FIG. 2 shows an inventive embodiment of the apparatus where the finished size of the workpiece bore can be controlled indirectly via the displacement path without an additional measuring device. For this purpose, the apparatus is provided with an input element 45 at which the required machining or stock removal can be set in conformity with the machining or stock removal allowance of the first workpiece. After the first "engagement" of the honing stones, this value determines the machining, i.e., when this value is achieved, the displacement is stopped and the "finished size" is stored in the displacement or feed control mechanism 25 and is shown at the indicator 40. With all of these successive workpieces, the displacement or feed control mechanism operates independently of the "engagement value" up to the finished size stored in the displacement control mechanism. The wear of the honing stones, which naturally occurs during the course of machining many workpieces, is automatically taken into account. For this purpose, a workpiece counter 48 and a wear-value input element 47 are associated with the displacement or feed control mechanism 25. As soon as the number of workpieces set at the workpiece counter 48 have been machined, the wear value preset at the input element 47 is added to the stored finished size, and is stored as the "new" finished size in the displacement or feed control mechanism 25.

The stored finished size can also inventively be manually changed by means of input elements, for example the keys-51 and 52. The arrangement can be such that with every manipulation of the key 51 the finished size becomes greater by a predetermined amount, and with every manipulation of the key 52 it becomes smaller by a predetermined amount. In this way, size errors which might occur, especially with the first workpieces, can be corrected in a simple manner.

In many machining instances it can be very advantageous to continue the machining after a predetermined value with a different machining speed in order to obtain, for example, a known, so-called "progressive" or "degressive" displacement.

For this purpose, as shown in FIG. 2, the displacement or feed control mechanism 25 is provided pursuant to a further embodiment of the present invention, with an additional input element 66 for the presetting of a partial machining. By means of a switch 50, this partial machining can selectively be associated with the first displacement or feeding speed (input element 39) or with the second displacement speed (input element 43). In the first instance, the machining value input at the input element 66 is computed starting with the engagement of the honing stones; in other words, as soon as this value is achieved after the honing stones have been applied, the displacement or feed control mechanism 25 transmits a signal 49 to the overall control mechanism of the machine, which, depending upon the machining situation, can in a known way effect a change of the spindle speed, the stroke speed, the workpiece clamping power, etc. At the same time, the displacement or feed control mechanism 25 switches to the second displacement or feed speed (input element 43) and to the second torque limit (input element 44) in order to continue the machining with a different, preferably higher, machining speed (progressive displacement).

If the partial machining prescribed at the in-put element 66 is associated with the second displacement speed by means of the selection switch 50, this value is recomputed by the finished size; i.e. by the amount of this prescribed value, prior to achieving the finished size, the displacement control mechanism 25 transmits the signal 49 to the overall or feed control mechanism of the machine, and switches over to the second displacement or feed speed and to the second machining momentum or torque limit. The machining now continues with a different, preferably lower, machining speed (degressive displacement), until the finished size is achieved.

Figure 3:
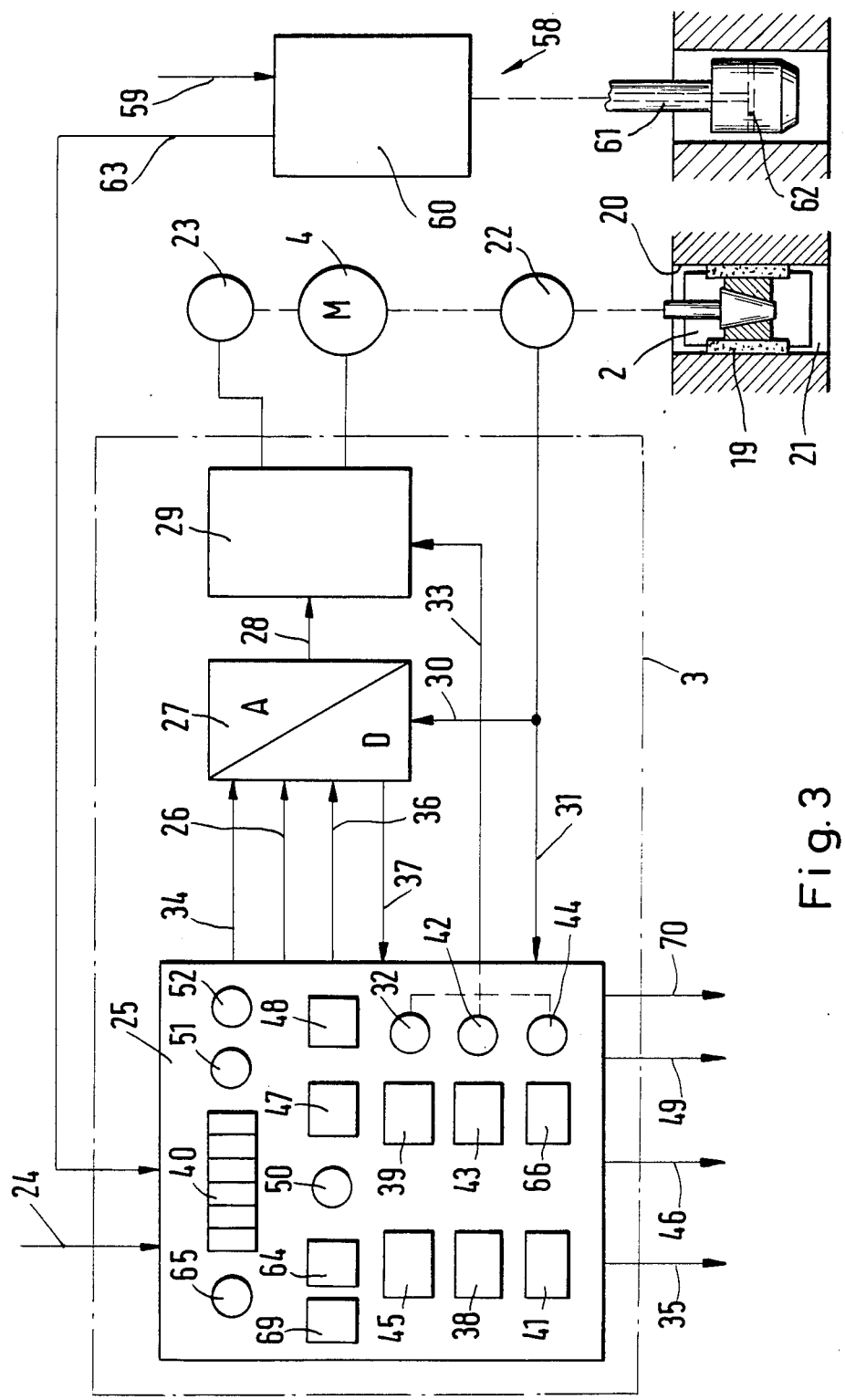

If very stringent requirements for an accurate measurement exist, especially with workpiece bores having a small diameter, an embodiment suitable for this purpose is illustrated in FIG. 3; in this embodiment, the control and regulating unit 3 operates in conjunction with a measurement-verifying device 58.

Here also at the beginning of the honing process, as soon as the honing tool 2 is introduced into the bore of the workpiece 21 and the stroke motion is stopped, the displacement or feed control mechanism 25 receives via a signal 24 from the overall control mechanism of the machine the command "start displacement", and the honing process is initially effected in the previously described manner. When the machining prescribed at the input element 45 is achieved, the displacement is stopped and the condition "finished size" is stored in the displacement or feed control mechanism 25. Immediately thereafter the displacement is returned and the honing process is concluded. The honing tool 2 is withdrawn, whereupon, via a signal 59 from the overall control mechanism of the machine, the measurement verification process is initiated. The measurement-verifying device 58, which is schematically illustrate in FIG. 3, essentially comprises a known measuring device 60, which is, for example, pneumatic/electrical, and to which is connected a mandrel 61, which in turn is provided with calibrated orifices 62 and can be automatically introduced into the workpiece bore 21 by suitable means for measuring purposes.

The arrangement can be such that the mandrel 61 is introduced into the still-clamped workpiece from below, so that a separate measuring station can be dispensed with. Pursuant to the present invention it is also possible to use a separate conveying device, such as a circular switching mechanism, to convey the workpiece to a measurement-verifying station where it can be measured. This possibly has the advantage that during the measuring process a new honing process can already begin, so that additional idle time is eliminated.

The measured value is compared in the measuring device 60 with the desired finished workpiece size, and the deviation is transmitted with the signal 63 to the displacement or feed control mechanism 25, where it is added along with the appropriate sign (+ or −) to the stored finished size, and is then stored as the "new" finished sized for the next workpiece.

This process is repeated with each workpiece, i.e. deviations in size which occur, for example due to wear of the honing stones, are immediately recognized by the measuring device and are compensated for by the displacement or feed control mechanism, as a result of which the tolerances are kept within very narrow ranges.

Figure 4:
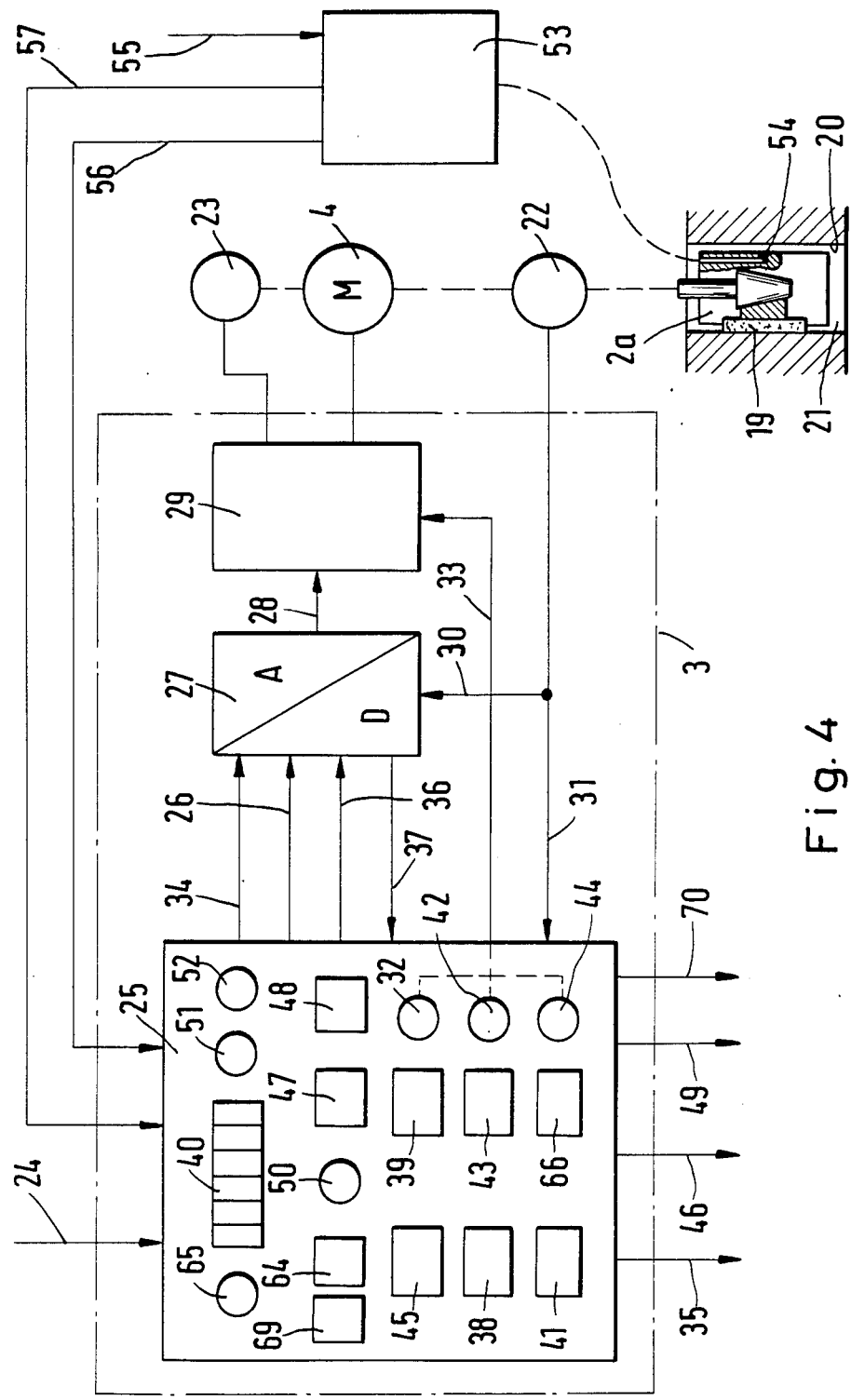

In the arrangement of FIG. 4, the finished size of the workpiece bore is controlled by suitable measuring device, for example a pneumatic measuring device 53, which in a known manner measures the diameter of the workpiece bore during the machining via a machining tool 2a which is provided with calibrated orifices 54. The measuring device is activated to begin the honing process by means of a signal 55 from the overall control mechanism of the machine. If during the course of the machining the finished size is achieved, the signal 56 "finished size achieved" is transmitted by the measuring device 53 to the displacement or feed control mechanism 25, which thereupon stops the displacement and brings about the termination of the honing process in the previously described manner.

Furthermore, the changing over during the machining to other machining parameters can be controlled by the measuring devices 53. When a predetermined workpiece diameter has been achieved, which diameter can be input in a known manner, the measuring device transmits a signal 57 to the displacement or feed control mechanism 25, which thereupon immediately changes over to a second displacement speed and to a second machining momentum. At the same time, via the signal 49 from the displacement or feed control mechanism 25, the overall control mechanism for the machine effects an alteration of the spindle rotation, the stroke speed, the workpiece clamping power, etc., in a known manner persuant to predetermined values.

In other respects, the operating sequence corresponds to that of the first described apparatus, so that a detailed description thereof can be dispensed with.

Figure 5:
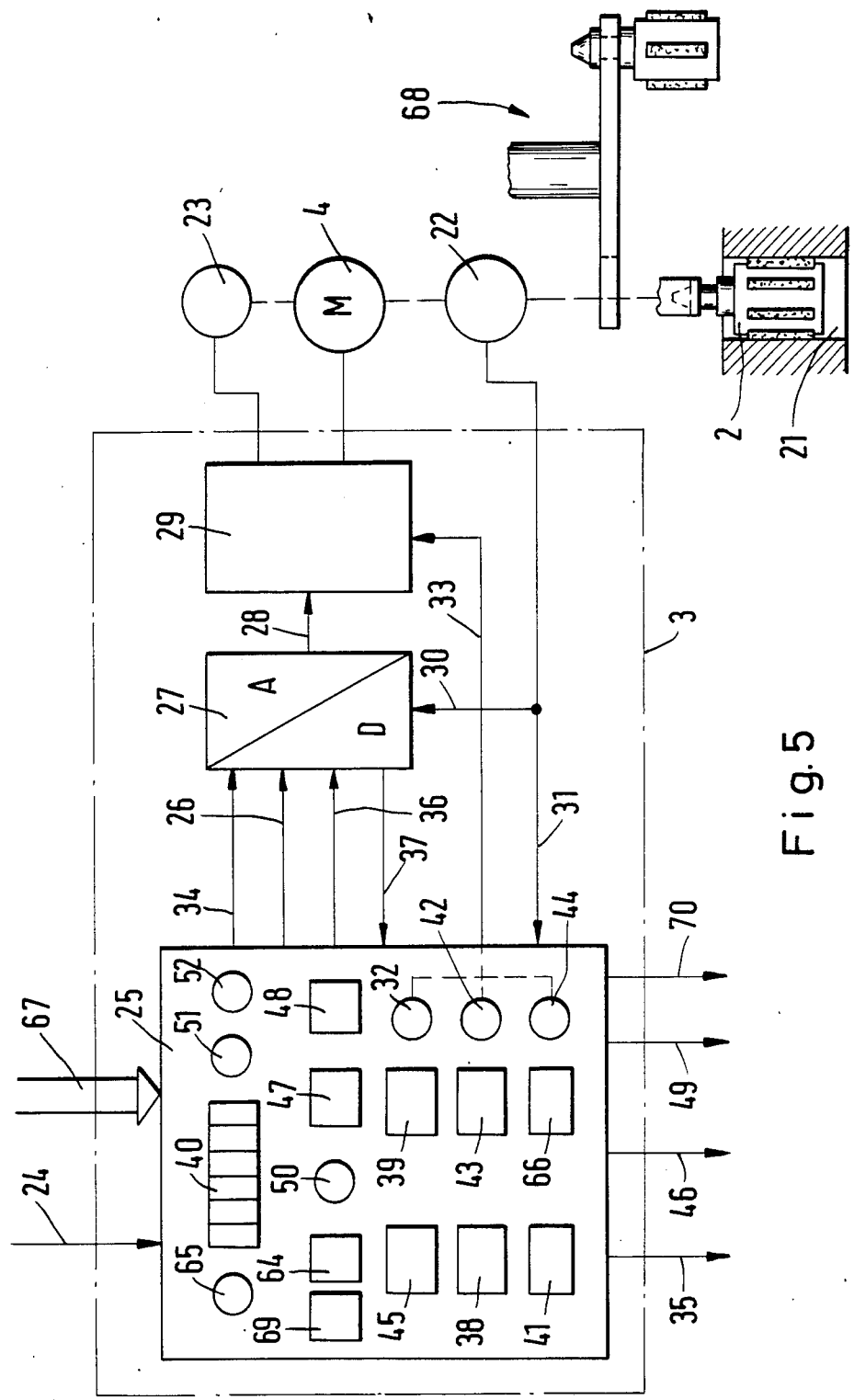

As schematically illustrated in FIG. 5, the inventive apparatus can furthermore be provided with a known remote control 67. Via this remote control 67, all the input elements associated with the displacement or feed control mechanism 25 can receive signals from the overall control mechanism of the machine.

Pursuant to a particularly advantageous feature of the present invention, it is possible via the remote control 67 to automatically input new adjustment values, for example after a tool has been changed, into the displacement or feed control mechanism 25, especially with machines having a tool storage mechanism 68 and automatic changing of tools. For this purpose, all of the adjustment data pertaining to the various tools stored in the mechanism 68 is stored in a known manner in the overall control mechanism of the machine. In the conformity with the sequence of use of tools, this data is successively transmitted via the remote control 67 into the displacement or feed control mechanism 25.

The present invention is, of course, in no way restricted to the specific disclosure of the specification and drawings, but also encompasses any modifications within the scope of the appended claims.

What we claim is:

1. A method of displacing a honing tool having stones for stock removal in workpiece bores, including the steps of initially rapidly feeding said tool until the latter contacts the workpiece, and then changing over to a slower stock removal feed step; the improvement therewith which comprises in combination the steps of:

effecting said rapid feeding and said stock removal feed by means of a single motor employed during said rapid feeding and said stock removal feed;

presetting the rapid feeding speed, the stock removal feed speed, and a respective torque limit of said motor; introducing said honing tool into said workpiece bore, thereupon rapidly feeding the honing stones of said tool with feeding means, and in so doing operating said single motor of a continuing feed at high speed and low torque limit in conformity with said preset values; turning said single motor off when said honing stones come to rest against the wall of said workpiece bore, and when said preset torque limit of said single motor is reached; after said honing stones come to rest against said bore wall and said single motor is shut off, temporarily changing the direction of rotation of said single motor and slightly backing-off said honing stones from said bore wall; after the conclusion of said backing-off step, automatically initiating a stroke motion of said honing tool, tool rotation and stock removal feeding, which pursuant to said presetting operates at a low stock removal feed speed and high torque limit; after achieving a predetermined finished size value, stopping said stock removal feeding, and briefly rotating said single motor in the opposite direction in order to back-off said stock removal feeding by a predetermined amount; inputting into a first input element a stock removal feeding value which in conformity with the stock removal task is necessary for the first of a series of workpieces which are to be machined; upon achieving this feeding value stopping said stock removal feeding; and storing the thusobtained position in a feed control mechanism as the finished size value; inputting, into a second input element of said feed control mechanism, a previously determined honing stone wearvalue which is related to a machined workpiece; and adding this value, in said feed control mechanism, to said finished size value to form a new finished size value, which is then stored;

operating said feed control mechanism via pulses; successively inputting into a position cycle regulator, for said stock removal feeding, one pulse at a time; and utilizing said pulse in such a way that with each pulse, said single motor is rotated further by a specific angular step, thus operating said single motor also as a quasi stepping motor particularly during said stock removal feeding.

* * * * *